(12) United States Patent
Lalumandier

(10) Patent No.: US 7,330,210 B2
(45) Date of Patent: Feb. 12, 2008

(54) METHOD AND APPARATUS FOR REPAIRING A VIDICON CAMERA

(76) Inventor: Monroe A. Lalumandier, 825 Saratoga Heights, Harvester, MO (US) 63304

( * ) Notice: Subject to any disclaimer, the term of this patent is extended or adjusted under 35 U.S.C. 154(b) by 816 days.

(21) Appl. No.: 10/756,229

(22) Filed: Jan. 13, 2004

(65) Prior Publication Data

US 2005/0151862 A1    Jul. 14, 2005

(51) Int. Cl.
*H04N 3/16* (2006.01)
(52) U.S. Cl. .............. 348/284; 445/2; 315/10
(58) Field of Classification Search ........... 445/2; 348/284; 250/339.02, 39.06, 549, 339.06
See application file for complete search history.

(56) References Cited

U.S. PATENT DOCUMENTS 2,495,203 A * 1/1950 Bramley et al. .......... 445/17
2,654,853 A * 10/1953 Weimer ..................... 315/10
3,366,434 A * 1/1968 Mengel ..................... 445/2
4,460,940 A * 7/1984 Mori ....................... 362/558

\* cited by examiner

*Primary Examiner*—Tuan Ho
*Assistant Examiner*—David Holt
(74) *Attorney, Agent, or Firm*—Harness, Dickey & Pierce, P.L.C.

(57) ABSTRACT

A method and apparatus is provided for repairing damage to a vidicon camera where the damage is indicated on a video display. The damaged photosensitive target of the video camera is illuminated by light from a light source, the light being of a wavelength and intensity to cause a reduction of the damage to the vidicon camera upon exposure over a period of time of the photosensitive target of the camera to the light from the light source.

19 Claims, 7 Drawing Sheets

METHOD AND APPARATUS FOR REPAIRING A VIDICON CAMERA

FIELD

The present disclosure generally is directed to a method and apparatus for repairing a vidicon camera, and more particularly to the photosensitive plate of a vidicon camera where the photosensitive plate has been damaged as indicated by dark or contrasting portions on a displayed image.

BACKGROUND

Cameras having vidicon tubes have been and remain in use in a wide range of applications. An example of a military application is the use of such cameras in guided bombs. It has been found that after a period of service many of these cameras develop damage to their photosensitive plates or targets which shows up as a blind or dark spot on a displayed image from the vidicon tube. When used in the guidance of a bomb, the seeker detection and guidance electronics of the bomb sees the damaged areas of the photosensitive target as potential bomb targets, thereby rendering the video guided bomb inoperable. Of course, one solution is to replace the defective vidicon camera, but such replacement is expensive and in many cases a replacement vidicon camera is not available.

The present disclosure solves these problems by providing a method and apparatus for repairing a vidicon camera where its photosensitive target has become damaged as indicated by contrasting spots on a video display generated from the damaged vidicon camera.

SUMMARY

In accordance with one embodiment of the disclosure, the damaged photosensitive target of a vidicon camera is repaired to render the camera operable. This is accomplished by subjecting the damaged photosensitive target of the vidicon camera to light from a light source for a sufficient period of time to eliminate or sufficiently reduce the damage. In one embodiment of the disclosure, the light source may comprise the emission of ultraviolet light directed onto the photosensitive target. In a further embodiment of the disclosure, the light source is modular and is configured and adapted to easily replace the optical module of the video camera during the repair operation.

Further features and advantages of the present disclosure, as well as the structure and operation of various embodiments of the present disclosure, are described in detail below with reference to the accompanying drawings.

DETAILED DESCRIPTION OF THE VARIOUS EMBODIMENTS

Figure 1:
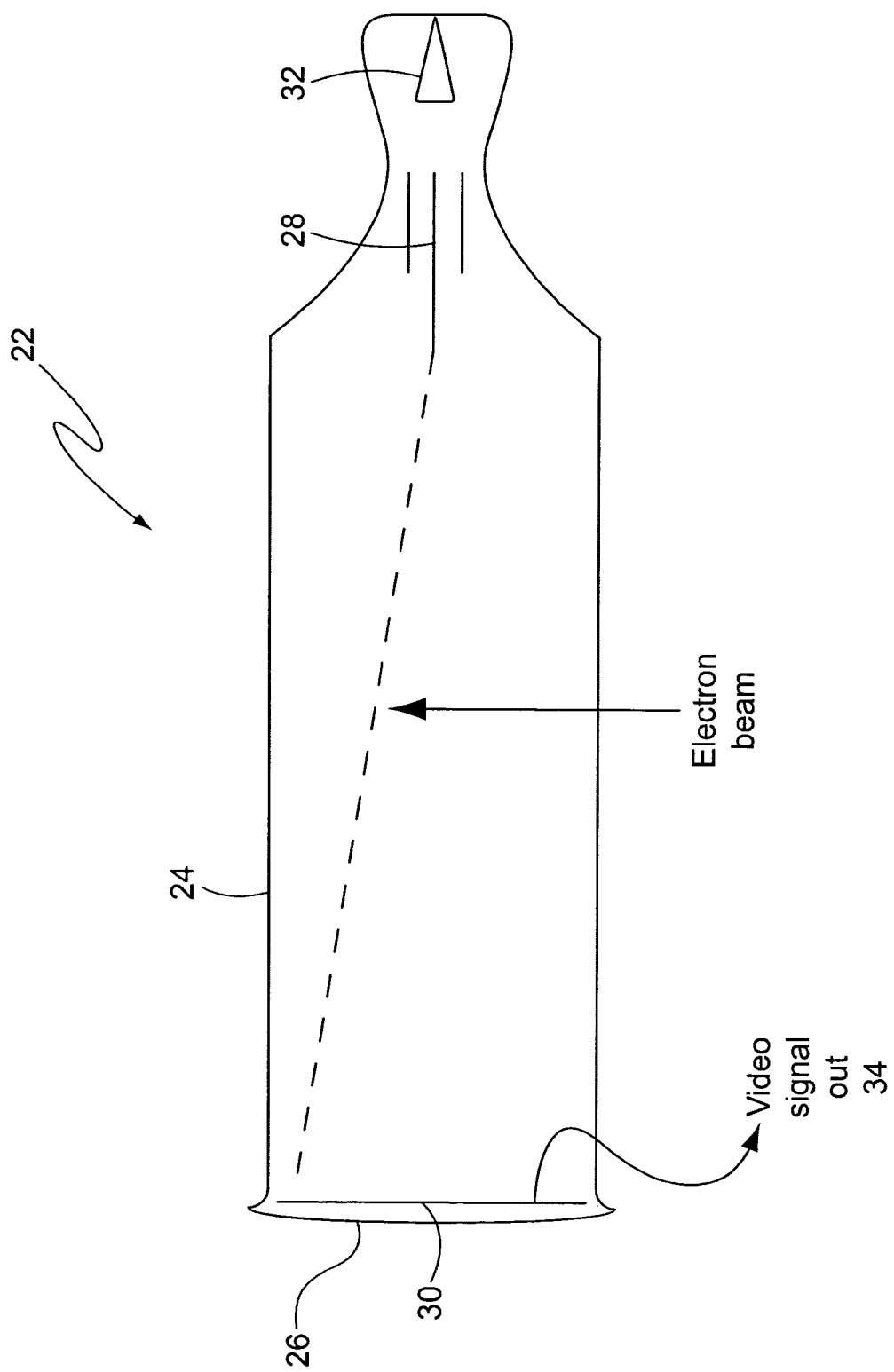
FIG. 1 is a schematic illustration of a typical vidicon camera.
Figure 2B:
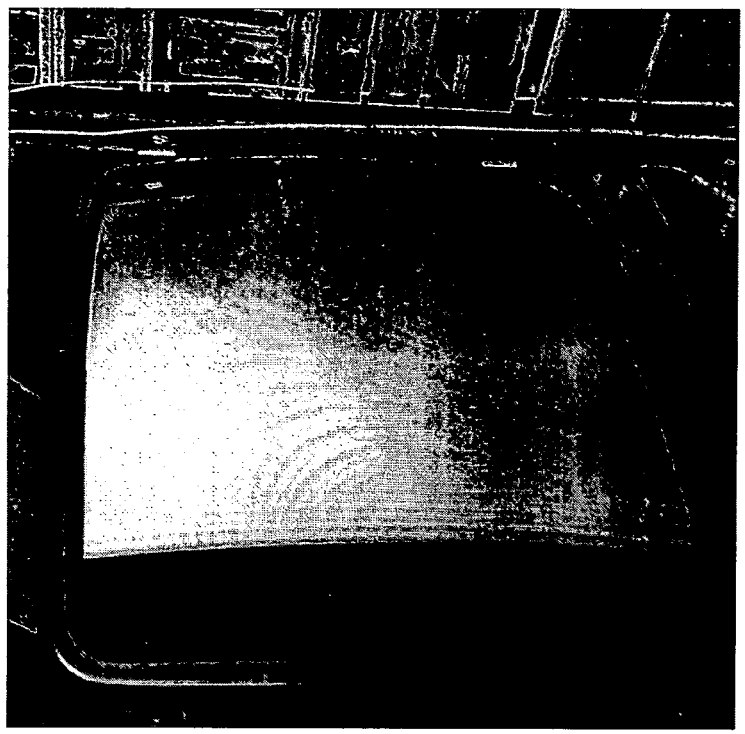
FIG. 2b is a photograph of the generated image of FIG. 1 after repair in accordance with this disclosure.
Figure 2A:
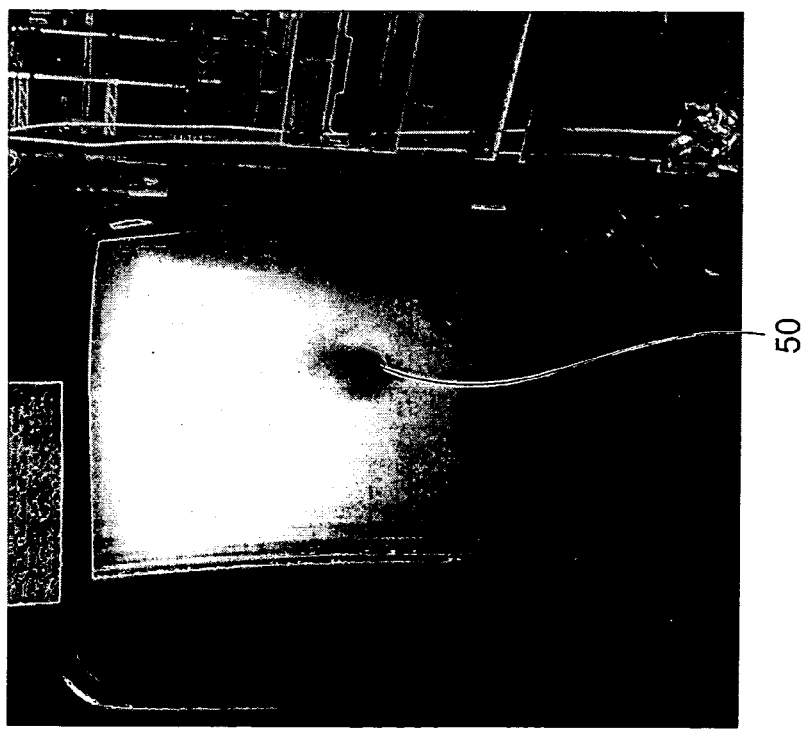
FIG. 2a is a photograph of an image generated using the vidicon camera of FIG. 1 where its photosensitive target has been damaged to produce a dark spot in the image.
Figure 3:
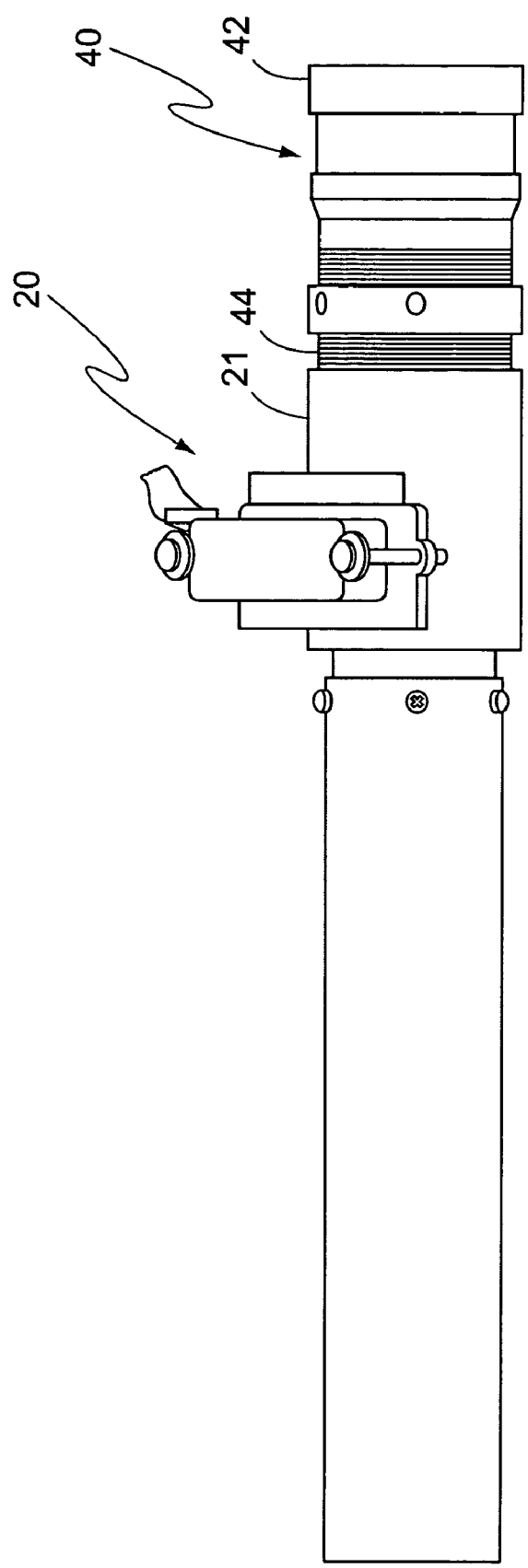
FIG. 3 is a side view of the vidicon camera illustrated schematically in FIG. 1.

With reference to the drawings, there is shown a vidicon camera 20 which may be repaired in accordance with one embodiment of the disclosure. The vidicon camera 20 includes a housing 21 (FIG. 2) within which is mounted a vidicon tube 22 (FIG. 1), the structure and operation of which is well known to those skilled in the art. Generally, the vidicon camera 20 comprises a vacuum tube 24 having a glass plate 26 at its forward end, and an electron beam generating element 28 that directs electron beams toward a photosensitive target 30. The electron beam is controlled to scan the photosensitive target in a prescribed scan pattern as determined by an electron beam scan control 32. Video output signals are generated at a video output 34 as the electron beam scans across the target. The video output signals may be used to regenerate the scanned image captured on the photosensitive target on a suitable monitor such as shown in FIGS. 2a and 2b. The video camera 20 also comprises an optics module 40 (FIG. 3) having a housing 42 supporting within the housing various optical elements (not shown) as is well known to those skilled in the art. With this described embodiment, the housing 42 of the optics module 40 has external threads 44 that engage mating internal threads 46 of the housing 21 allowing the optics module to be easily attached to and detached from the vidicon tube housing 21.

As previously explained, vidicon cameras have been widely used for many applications, and their structure and operation are well known to those skilled in the art.

FIG. 2a shows a video monitor image of a photosensitive target of a vidicon camera that has become damaged as indicated by a dark spot 50 generated on the display. As previously explained, unless repaired to eliminate or substantially reduce the damaged portion, the vidicon tube may be inoperable for its intended purpose. The present disclosure comprises a method and apparatus for repairing the vidicon camera by eliminating or reducing the damage as exemplified by the image display in FIG. 2b.

Figure 4:
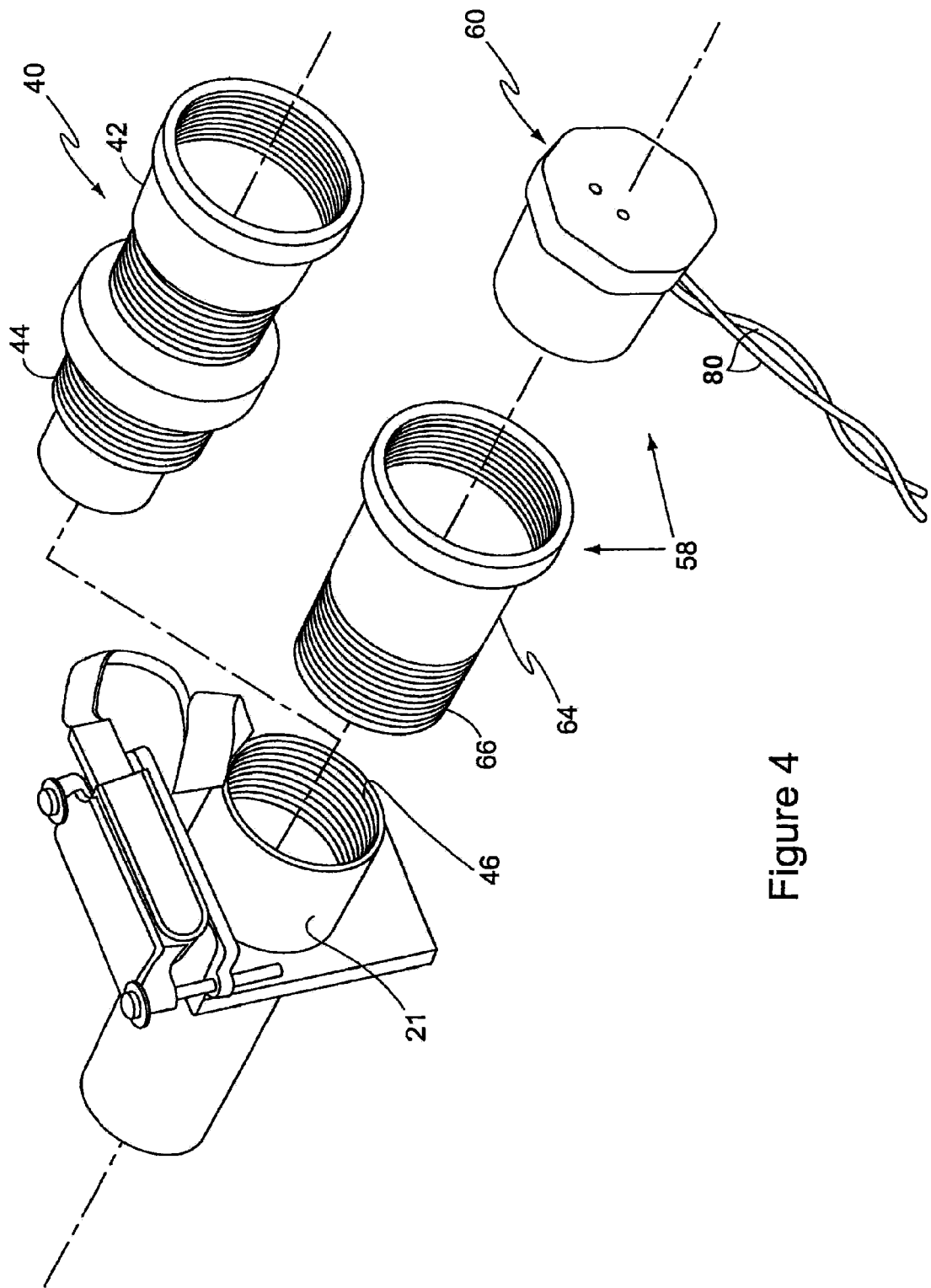
FIG. 4 is an exploded respective view of the vidicon camera of FIG. 3 and also showing a light source module in accordance with one embodiment of the present disclosure.
Figure 5:
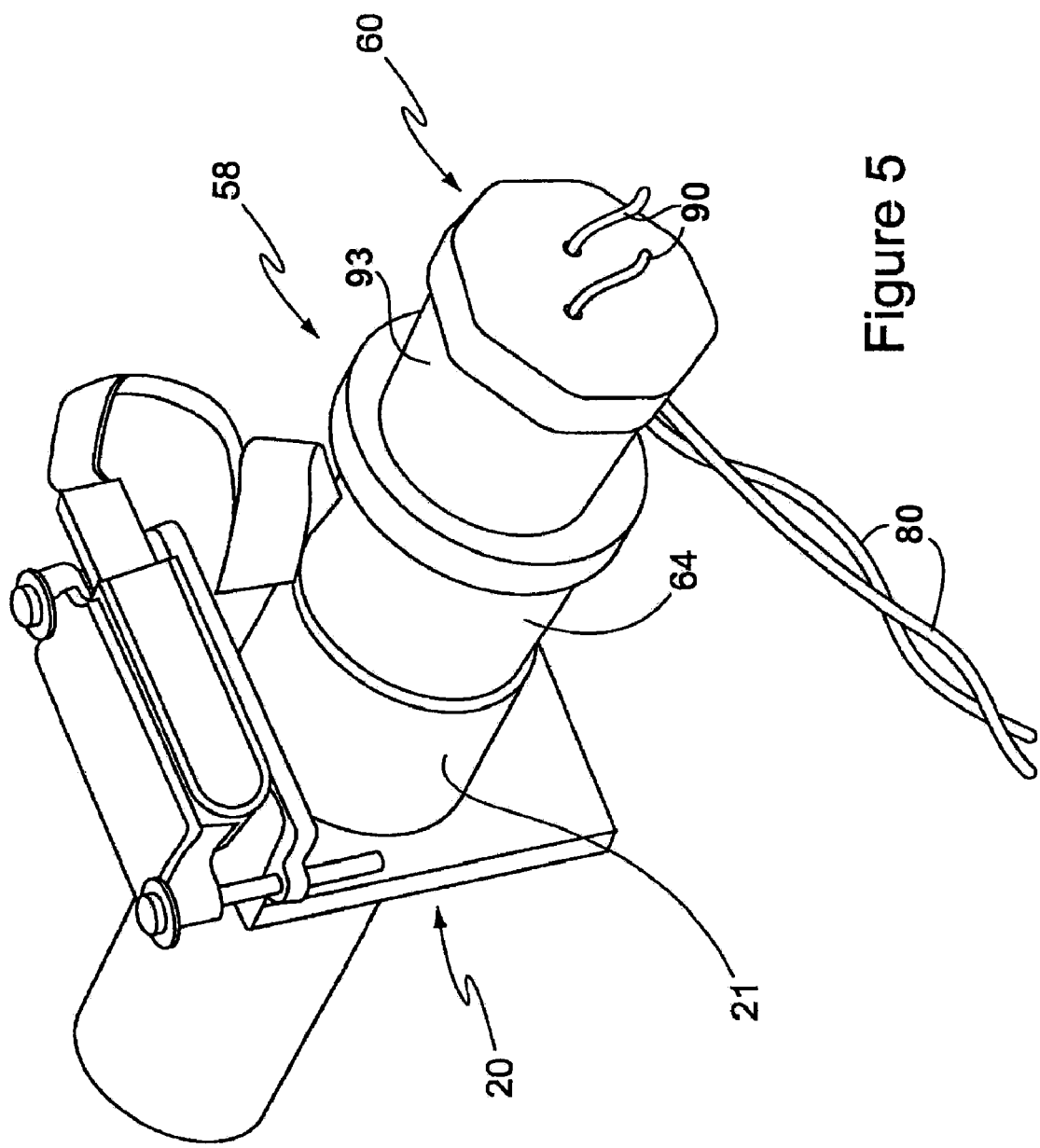
FIG. 5 is a perspective view showing a vidicon camera in a repair configuration where the camera's optics module has been replaced with a light module in accordance with one embodiment of the disclosure.

In accordance with the disclosure, the photosensitive target is illuminated for a period of time with light from a suitable light source. In one embodiment of the disclosure there is provided a light source module 58 (FIGS. 4 and 5) that includes a light source 60 comprising an array 62 of light-emitting diodes 63 for emitting ultraviolet light toward the photosensitive target 30. The light source 60 is mounted to a housing member 64 which has external threads 66 at one end that mate with intennal threads 46 of the vidicon tube housing 21. A diffuser (not shown) may be mounted in the housing 64 between the diodes and the camera 20 to diffuse the light from the diodes. The light source 60 may be press fit into the end of the housing member 64 opposite from the threaded end 66.

Figure 6:
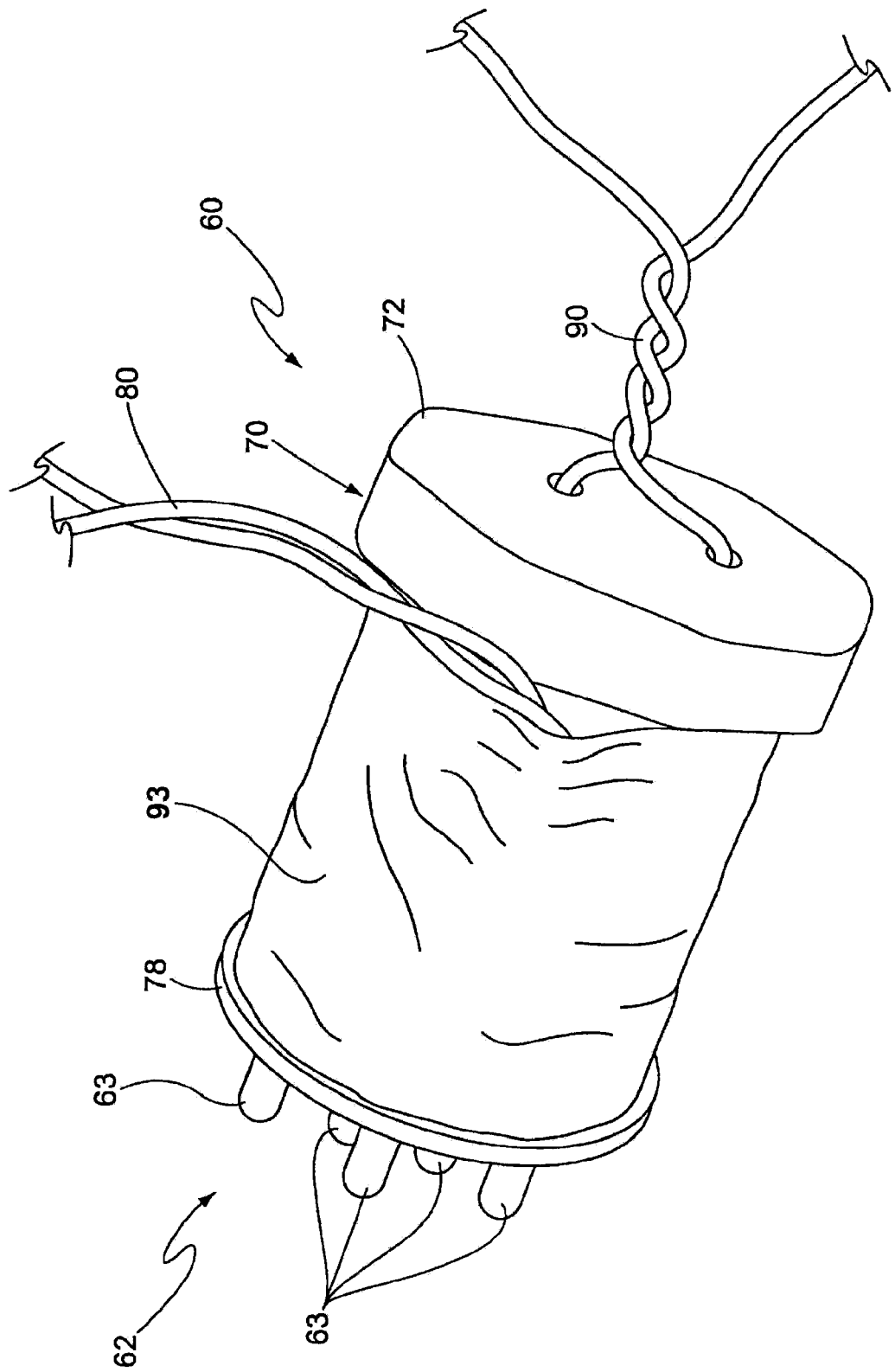
FIG. 6 is a perspective view of a light source assembly of one embodiment of the disclosure.
Figure 7:
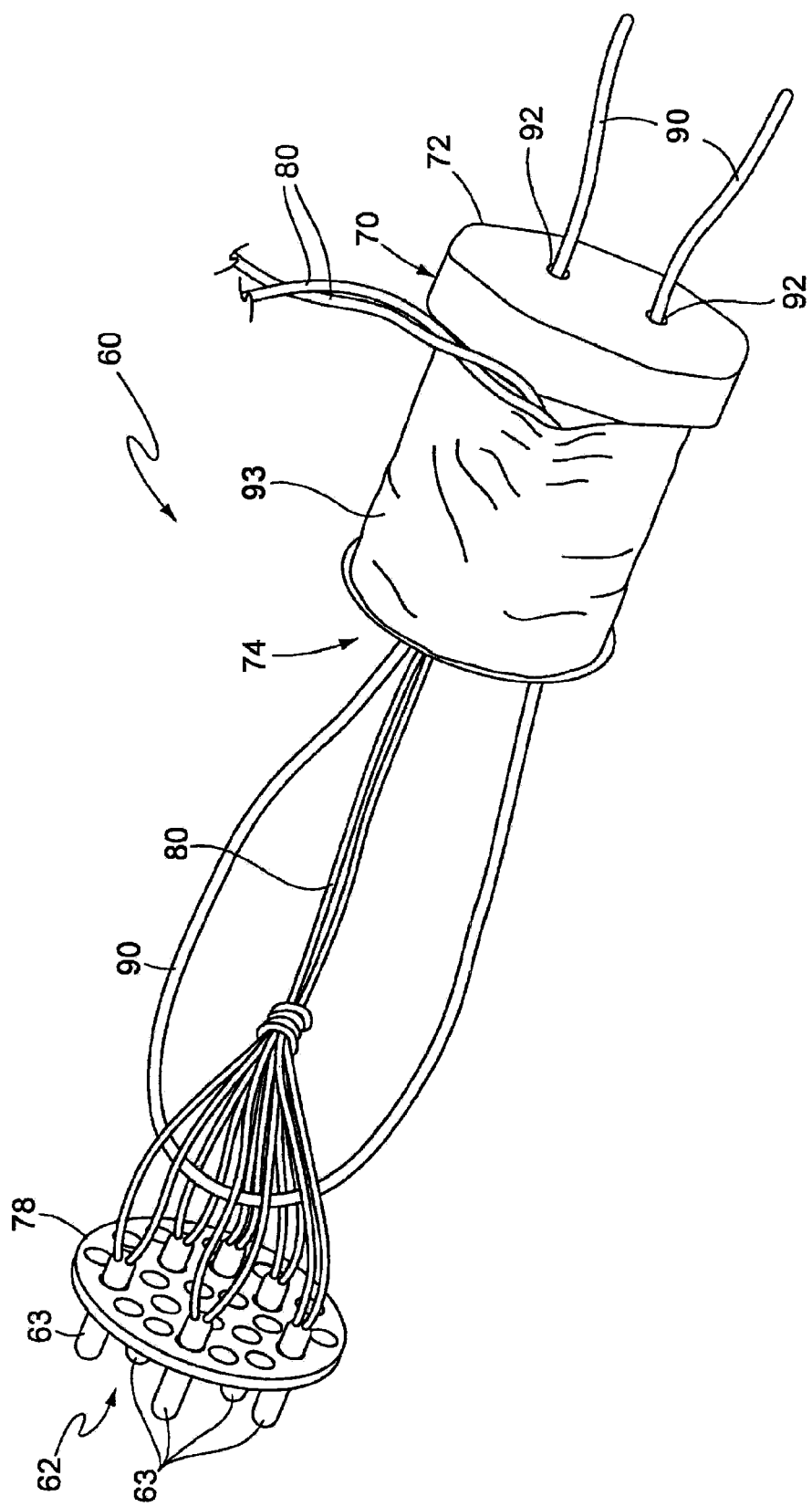
FIG. 7 is an exploded respective view of the light source of FIG. 6.

With particular reference to FIGS. 6 and 7, the light source 60 may comprise a housing 70 having a closed end 72 and an open end 74. The housing 70 preferably is of a plastic material. A disk-shaped circuit board 78 supports the LEDs 63 which are electrically connected in parallel and powered through electrical leads 80 by a suitable power source. The electrical leads extend from the LEDs 63 into the open end of the housing 70, and exit the housing through a suitable opening in the side wall of the housing. While there are several LEDs 63 shown in the drawing for illustration purposes, it is to be understood that a greater or fewer number of LEDs may be used as is appropriate to fully illuminate the vidicon tube target.

The circuit board/LED assembly is secured to the open end of the housing 70 by a wire 90 that extends through openings 92 (FIG. 7) in the closed end of the housing and loops through the connecting wires to the LEDs. The wire 90 is pulled from the back side of the light source 60 so as to pull the loop into the housing 70, thereby pulling the circuit board/LED assembly snugly against the open end of the housing where it is held in place by twisting the free ends of the wire (FIG. 6). Other suitable means, which may include other types of fasteners or adhesive, may be used to secure the circuit board/LED assembly to the housing. A wrap 93, which may be a mylar tape, surrounds the outer cylindrical surface of the housing 70.

To assemble the light source 60 to the housing member 64, the diode end of the light source is inserted into the end of the housing 64 with the wrap 93 providing a press fit between the two components to secure them together. This also allows the components to be readily separated, such as for the purpose of replacing diodes. While a press fit has been described, it is to be understood that other means, including a threaded connection, may be used to secure the light source 60 to the housing member 64.

In accordance with one embodiment of the disclosure, the light source 60 is adapted to provide ultraviolet light at a wavelength of greater than about 365 nm (nanometers), and preferably at a wavelength of greater than about 375 nm, and more preferably at a wavelength of greater than about 400 nm. The light source 60 is further adapted to provide light at an intensity of at least about 25 cd (candelas), and more preferably at an intensity of at least about 56 cd.

To repair a vidicon camera having a photosensitive target that has been damaged as shown by one or more dark spots on a displayed image from the camera, the photosensitive target is illuminated with light emitted from the light source 60. This is easily accomplished by simply removing the optics module 40 by unscrewing the optics module from the end of the vidicon tube housing 42, and replacing the optics module with the light source module 58. In replacing the light source module 58, the module may be attached as an assembled unit to the vidicon tube housing 21, or the light source housing 64 may be first attached to the vidicon tube housing 21 and then the light source 60 attached to the light source housing. With the light source module 58 mounted to the vidicon tube housing 21, the photosensitive target 30 is illuminated by light from the light source 60 for a duration of time sufficient to reduce or eliminate the damaged portion of the photosensitive target as indicated by a reduction or elimination of the dark spot or spots shown on the display as shown in FIG. 2b.

Over time, as the damaged photosensitive target is subjected to illumination by the light source 60, the dark spots representing the damaged portions reduce in size and in contrast with the lighter image portions of the display representing the non-damaged portions of the photosensitive target. The period of time that the photosensitive target must be subjected to illumination from the light source 60 in order to repair the damage may vary from several hours to several days, depending upon the severity of the damage and stringency of the test standards that must be met. Such damage may be considered repaired when the vidicon camera 20 has been restored to a condition of operability for its intended purpose as may be determined in accordance with prescribed test standards. One such test standard may be a general acceptance test involving the use of a test pattern and the ability of the repaired vidicon tube to create an acceptable image of the test pattern. Another such test standard requires that the vidicon camera 20 meet prescribed operating standards for a specific application. An example of such an application specific test is a seeker alignment test for testing a guided bomb unit. The seeker alignment test determines if the electronics of the guided bomb unit are able to properly identify and track a target.

Although the present disclosure finds use in a military application as previously indicated, it is to be understood that the disclosure finds application for repairing any vidicon tube that has suffered damage to its photosensitive target as heretofore described.

While the present disclosure has been described by reference to specific embodiments and specific uses, it should be understood that other configurations and arrangements could be constructed, and different uses could be made, without departing from the scope of the disclosure as set forth in the following claims.

What is claimed is:

1. An apparatus for repairing damage to a vidicon camera where the damage is indicated on a video display, said apparatus comprising:
   a vidicon camera having a vidicon tube housing to which is secured a removable optics module, and a photosensitive target disposed within said housing, said target adapted to be scanned by an electron beam to capture an image viewed by said optics module, said camera exhibiting damage as indicated by a video display of the captured image;
   a video display for displaying the captured image;
   a light source adapted to be removably secured to said housing in place of said optics module, without any electrical connections between said light source and said housing; and
   said light source adapted to emit light onto said photosensitive target, said light being of a wavelength and intensity to cause a reduction of the damage to the vidicon camera upon exposure over a period of time of said photosensitive target to light from said light source, said reduction of damage being indicated by said video display.

2. The apparatus of claim 1 wherein said damage is indicated by contrasting portions present in the video display of the captured image that are not present in the image viewed by said camera.

3. The apparatus of claim 2 wherein said light substantially uniformly illuminates said photosensitive target with light of a substantially uniform wavelength and intensity.

4. The apparatus of claim 3 wherein the wavelength of said light from said light source is at least about 365 nm.

5. The apparatus of claim 4 wherein the intensity of said light from said light source illuminating said photosensitive target is at least about 25 cd.

6. The apparatus of claim 1 wherein said light source comprises an LED array.

7. The apparatus of claim 1 wherein said light source further comprises a light source housing and light-emitting elements mounted to said light source housing.

8. The apparatus of claim 7, there being an absence of lenses between said light source and said vidicon tube with said light source housing attached to said vidicon tube housing for illuminating said photosensitive target with light from said light source.

9. The apparatus of claim 8 further comprising a diffuser between said light-emitting elements and said vidicon tube.

10. The apparatus of claim 1 wherein said period of time is from several hours to several days.

11. The apparatus of claim 1 wherein the light emitted by the light source is ultraviolet light.

12. An apparatus for repairing damage to the photosensitive target of a vidicon camera where the damage is indicated on a video display by at least one contrasting portion on the display, said apparatus comprising:
  a vidicon tube housing within which is disrosed a vidicon tube, the vidicon tube housing also including a removable optics module threadably engaged with a threaded portion of said housing, said vidicon tube having a photosensitive target scanned by an electron beam to capture an image viewed by said vidicon tube, said vidicon tube exhibiting damage as indicated by a video display of the captured image;
  a video display for displaying the captured image;
  a light source removably secured to said threaded portion of said vidicon tube housing, without any electrical connections between said light source and said housing; and
  a light source having a plurality of light emiffing diodes (LEDs) for emitting ultraviolet light onto said photosensitive target, said light being of a wavelength and intensity causing a reduction of the damage to the vidicon tube upon exposure over a period of time of said photosensitive target to the ultraviolet light from said light source, said reduction of damage being indicated by a reduction in intensity contrast of said at least one contrasting portion of said display.

13. A method of repairing damage to a vidicon camera where the damage is indicated on a video display, said method comprising:
  removably supporting an optics module from a vidicon tube housing of said vidicon camera;
  removing said optics module from said vidicon tube housing and securing a light source to said housing in place of said optics module, without the need for any electrical connections between said light source and said vidicon tube housing; and
  using said light source to illuminate, over a period of time, the photosensitive target of a vidicon tube of the vidicon camera with light of a wavelength and intensity to cause a reduction of the damage to the vidicon camera as indicated by said video display.

14. The method of claim 13 wherein said photosensitive target is illuminated with ultraviolet light.

15. The method of claim 14 wherein said photosensitive target is illuminated with light of a wavelength of at least about 365 nm.

16. The method of claim 14 wherein said photosensitive target is illuminated with light of an intensity of at least about 25 cd.

17. The method of claim 14 wherein said photosensitive target is illuminated with said light for a period of time of several hours to several days.

18. The method of claim 13 wherein said damage is indicated by at least one contrasting spot on said video display, said photosensitive target being illuminated by said ultraviolet light for a period of time that reduces the size and contrasting intensity of said at least one spot on the display so to render the vidicon tube operable for its intended purpose.

19. The method of claim 13 wherein said photosensitive target is illuminated substantially uniformly over the target.

* * * * *

UNITED STATES PATENT AND TRADEMARK OFFICE
CERTIFICATE OF CORRECTION

PATENT NO. : 7,330,210 B2  
APPLICATION NO. : 10/756229  
DATED : February 12, 2008  
INVENTOR(S) : Monroe A. Lalumandier Page 1 of 1

It is certified that error appears in the above-identified patent and that said Letters Patent is hereby corrected as shown below:

Please correct the Title Page below the Inventors Information to include the following: Item (73) Add "Assignee:   The Boeing Company  
            100 North Riverside Plaza  
            Chicago, IL 60606-1596"

Signed and Sealed this

Second Day of December, 2008

JON W. DUDAS  
*Director of the United States Patent and Trademark Office*